(12) United States Patent
Pordy

(10) Patent No.: US 6,340,189 B1
(45) Date of Patent: Jan. 22, 2002

(54) UNIVERSAL DEVICE FOR FACILITATING MOVEMENT INTO AND OUT OF A SEAT

(75) Inventor: William Pordy, New York, NY (US)

(73) Assignee: N/Amp Company, Inc., New York, NY (US)

( * ) Notice: Subject to any disclaimer, the term of this patent is extended or adjusted under 35 U.S.C. 154(b) by 0 days.

(21) Appl. No.: 09/466,252

(22) Filed: Dec. 17, 1999

(51) Int. Cl.$^7$ .................................................. B60J 9/00
(52) U.S. Cl. ....................................... 296/1.1; 16/110.1
(58) Field of Search ............................. 296/1.1; 16/436, 16/110.1

(56) References Cited

U.S. PATENT DOCUMENTS

| | | |
|---|---|---|
| 3,739,793 A | 6/1973 | Wilson |
| 4,062,372 A | 12/1977 | Slusher |
| 4,072,339 A | 2/1978 | Rothlisberger |
| 4,183,177 A | 1/1980 | Kurdziel |
| 4,314,576 A | 2/1982 | McGee |
| 4,600,239 A | 7/1986 | Gerstein et al. |
| 4,626,016 A | 12/1986 | Bergsten |
| 4,843,661 A | 7/1989 | Skibinski |
| 4,922,560 A | 5/1990 | Skibinski |
| 5,104,169 A | 4/1992 | Kopnski |
| 5,323,511 A | 6/1994 | Gray |
| 5,640,986 A | 6/1997 | Herman |
| 5,765,987 A | 6/1998 | Zimmerman |
| 5,787,515 A | 8/1998 | Mason et al. |
| 5,913,562 A | 6/1999 | Mattarella |

Primary Examiner—Stephen T. Gordon
Assistant Examiner—Jason Morrow
(74) Attorney, Agent, or Firm—Lackenbach Siegel Marzullo Aronson & Greenspan, P.C.

(57) ABSTRACT

A universal device facilitates egress and/or ingress of a passenger from a vehicle having a door opening through which any passenger and/or driver can move into and out of a seat in the vehicle, and has a post or pillar to one side of the individual's seat. The device includes an elongate member having a handle at one end suitable for being gripped by the passenger. The other end of the elongate member is formed with an engaging member or element for securing the elongate member on a lateral surface of the post in proximity to the seated user. In one form, the engaging members or elements are in the form of tapered bodies having a smaller apex at one end and gradually increasing in thickness with or without an indented, scalloped edge to facilitate and to secure insertion of the engaging member through an upper opening of a striker mounted on the lateral surface of the post. Preferably, a heel is mounted or forms part of the engaging member at a point remote from the apex or pointed end that can be used to limit movement of the device when same is pulled towards the vehicle interior or towards the passenger situated on the seat of the vehicle. In other embodiments of the engaging members, indentations may be provided for engaging forward and/or rear leg portions of the striker to prevent slippage relative thereto when the user applies a pushing or pulling force on the handle. This device can also be used with appropriately prepared seats/seating situations, such as theater seats, wheelchairs, home seating, as needed.

23 Claims, 7 Drawing Sheets

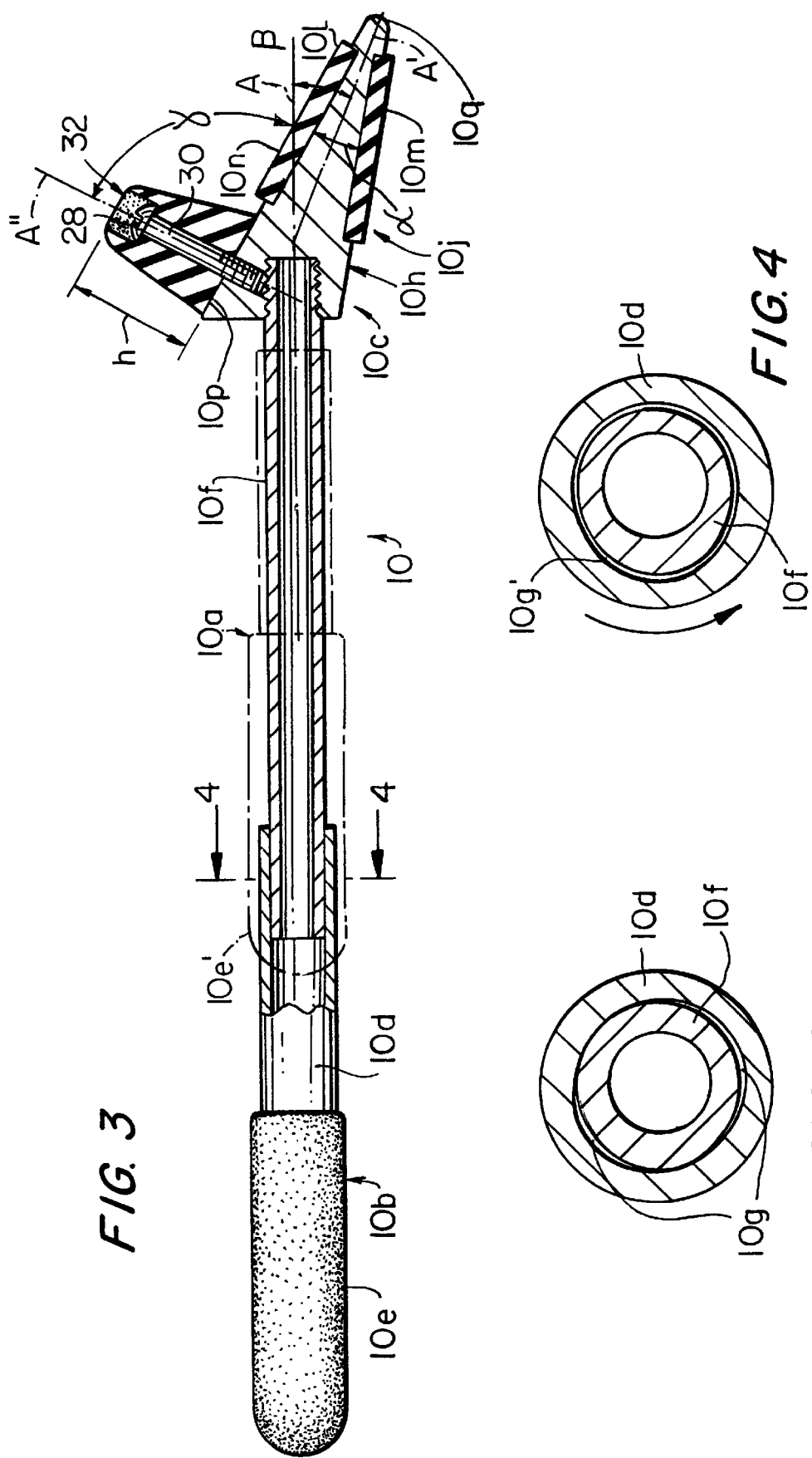

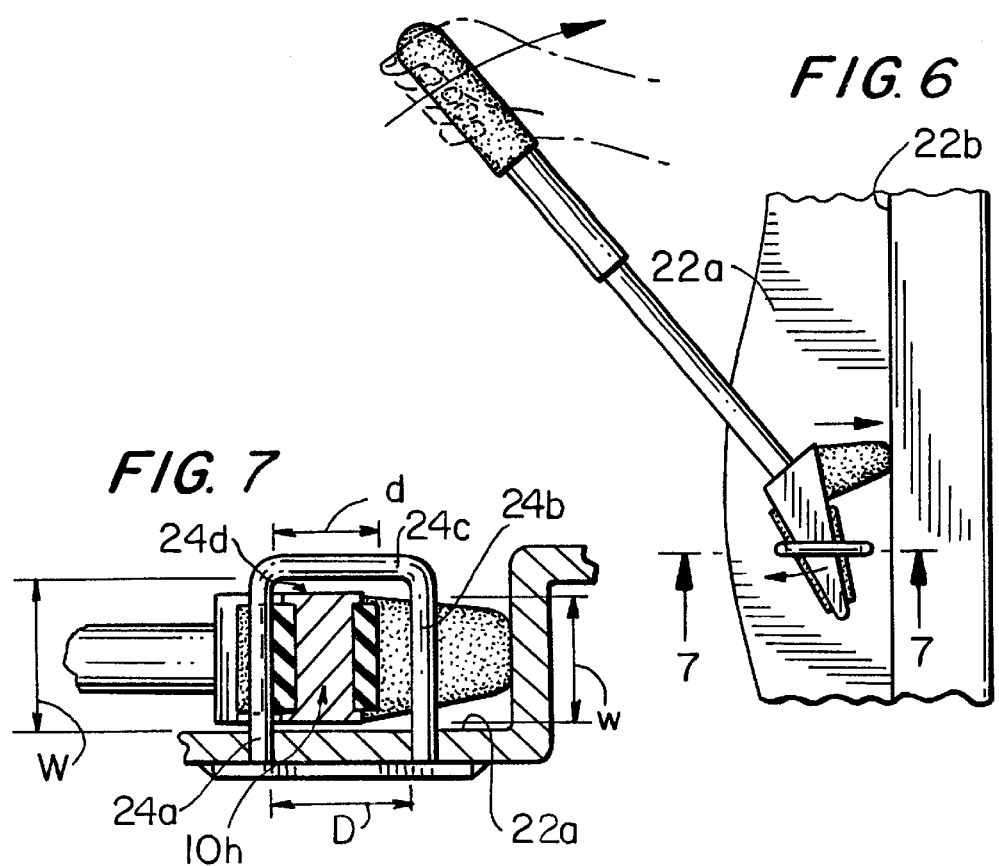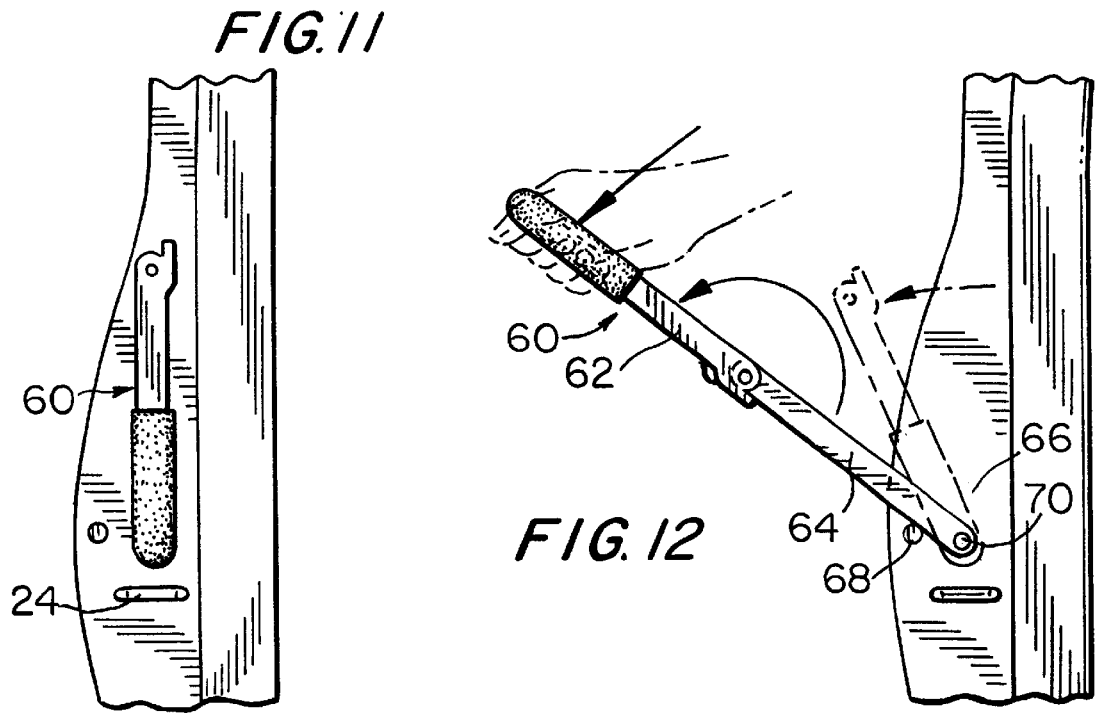

UNIVERSAL DEVICE FOR FACILITATING MOVEMENT INTO AND OUT OF A SEAT

CROSS REFERENCE TO DISCLOSURE DOCUMENT

This application is related to Disclosure Document No. 455,461 filed Apr. 23, 1999.

BACKGROUND OF THE INVENTION

1. Field of the Invention

The present invention generally relates to automobile accessories and, more specifically, to a universal device for facilitating movement into and out of a seat, including egress and ingress from a vehicle.

2. Description of the Prior Art

Demographics show that the world's population is shifting toward a dramatic increase in the numbers of mature and elderly people (people older than 60 years). A large and growing proportion of this population relies on automobile transportation. Moreover, in the United States people of all ages and transportation needs—from work to healthcare, recreation and social activities—are relying more and more on their automobiles as their primary mode of transportation.

Many people have difficulty rising from a seated position because of age, infirmity, disability or other chronic or acute condition. This is frequently of greater concern when such people are seated in automobiles, as either drivers or passengers, because such seats are arranged at different angles of inclination and variable heights above the ground level. In some cases, particularly with larger vehicles, such as the growing number of vans and sports utility vehicles in which the seats are generally higher above the ground, a passenger must lower the trunk of his or her body relative to the seat in order to reach the ground and assume a standing position. In other cases, particularly in connection with sportier cars having lower centers of gravity, the seats are generally very low and close to the ground, and the passenger needs to raise or elevate the trunk of his or her body before assuming a standing position on the ground.

Today there are approximately 35 million Americans over the age of 65, 90% of whom have active driver's licences and 78% of whom rely on passenger vehicles as their primary mode of transportation. It is estimated that in less than ten years this number will increase to approximately 50 million. These numbers will almost double when considering Americans in the age group 55–64 who use their cars more than other groups for recreation, shopping and errands.

In addition to these numerous mature Americans, there are many more individuals who have chronic diseases, such as arthritis, chronic back pain, etc. Many such drivers and passengers of vehicles have different degrees or levels of difficulty in entering or leaving a wide variety of vehicles. While designers of automobiles are beginning to address the issue of aging drivers and passengers in order to better accommodate the needs of such individuals, the focus until now has been on modifying aspects of the automobile that primarily assist drivers in operating the vehicles safely. Thus, modifications in this area have included providing larger dashboard controls, flatter doors and re-designed trunk handles. The one major unmet need that manufacturers have thus far overlooked is the problem of exiting and entering a vehicle itself, this being a problem of paramount importance to the broad public described above. The modifications that have thus far been proposed, such as larger gages, etc., will not aid in exiting and entering the car.

Several devices have been proposed for assisting passengers in exiting a motor vehicle. However, these have had a number of disadvantages. In U.S. Pat. No. 4,072,339, a U-shaped handle member is secured to a door post of a high ground clearance passenger vehicle. The handle member is secured to the door post at a point along its vertical length to be in a position to be grasped by the hand of a vehicle entrant so that the entrant may apply a lifting force to assist themself into the vehicle. However, the handle is permanently attached to the door post and is generally arranged within the passenger compartment. In order to be accessible to a person outside of the vehicle, the handle extends laterally of the door post and may, in some instances, actually interfere with the entry or egress from the vehicle. Also, because the handle is permanently mounted, it is only useful for that one door and that one vehicle. Too, the user does not have the option of removing the handle when not in us or if the handle interferes with passengers or cargo within the compartment, or if the user is not pleased with the aesthetic appearance of the handle projecting into the compartment.

In U.S. Pat. No. 5,104,169, a handicap assist apparatus is disclosed which is secured to the roof of the vehicle above the passenger compartment. The bar intended to be grasped is suspended by means of a flexible tether line in the form of a chain. However, the use of this device requires the drilling of a hole in the roof of the vehicle, which could, if not properly sealed, result in water leaking through the opening into the passenger compartment. Additionally, the mounting of the apparatus is intended to be permanent, this interfering with the passenger sitting below the apparatus, as when driving.

A handle for a vehicle window is disclosed in U.S. Pat. No. 5,323,511. However, such device has a number of disadvantages. The handle mounting member, which includes a hook, simply rests on the top edge of the window but is not otherwise fixed and therefore can slide along the edge. This does not provide the level of stability that is required in any given instance. Applying sufficiently strong pulling force on the handle could, in some instances, damage or break the window glass; additionally, and most important, because the window glass is part of the door, and the door is pivotally mounted on hinges, the application of a pulling or pushing force on the handle could result in corresponding movements of the door itself, again resulting in a deterioration of the stability that a user clearly requires in entering or exiting the vehicle and/or preventing bodily harm.

In U.S. Pat. No. 5,913,562, access handgrips for use during ingress and egress from a vehicle are disclosed. The handgrips disclosed in this patent are primarily intended to be use with enhanced capacity vehicles (ECV). The handgrips are formed on the front seat and/or an interior body panel disposed on a narrow wall of the passenger compartment of the vehicle. However, the positioning of such handgrips inside of the passenger compartment does not always provide the reach or degree of leverage that may be required by an individual entering or leaving a vehicle. Additionally, because these handgrips are, in some cases, mounted on a seat, this may render such access handgrips unavailable or inconvenient to grasp when the vehicle seat is reclined, folded and/or removed from the vehicle.

In U.S. Pat. No. 4,626,016, a structural aid is disclosed for facilitating egress from a vehicle. The disclosed aid includes a sleeve mounted in a doorframe of the vehicle and a handlebar is insertable therein. The handlebar includes a sleeve-engaging portion adapted to be inserted in and withdrawn from the sleeve. The sleeve and the handlebar are configured so that when the sleeve-engaging portion is inserted into the sleeve, the handlebar extends generally outwardly from the vehicle and the handle portion is positioned so as to be readily grasped by an occupant of the vehicle. This device has a number of disadvantages. First, the design requires the formation of generally large apertures within the door post flange on which the doors are pivotally mounted by means of hinges. Such substantial apertures may significantly cause a deterioration of the integrity or strength of the flange in supporting a relatively heavy door. Considering that very strict guidelines are imposed by the federal government for various loads that must be sustained by door hinge and latch assemblies, any tampering with such components could result in conditions which do not satisfy the established requirements and, moreover, damage the operation and safety of such doors. So, the device may only be used with the doors that have been modified. Since the installation is an expensive one and use is limited to one door alone, the device is usable only in select circumstances by only one passenger. Additionally, the elongate portion forming the part of the handlebar is inserted into the aperture in the mounting plate from outside of the vehicle. While the handle portion may be pulled toward the vehicle, a force on the handle portion tending to push the same away from the vehicle would cause the handlebar to slide out of the aperture. Thus, while the structural aid disclosed in this patent could provide support when a passenger pulls on the handlebar towards the vehicle, it does not provide the necessary support if conditions require a pushing on the handlebars. As such, the structural aid of this patent is not usable by the individual under all conditions and, therefore, is not universal in that respect. Also, as the device must be inserted into the narrow, directed sleeve from the outside by moving it towards the vehicle, it is nar impossible for any given passenger looking to use the device to exit the car to install the device themself (particularly from a normal sitting position).

It will be appreciated that many of the difficulties that have been described are also applicable when a person in the aforementioned class attempts to sit down into or leave almost any seat, including chairs, couches, wheelchairs, or the like. The same or similar solutions proposed can also be used, with possible minor modifications with almost any seat.

SUMMARY OF THE INVENTION

Accordingly, it is an object of the present invention to provide a device which is universal in its functionality and can be used for facilitating movement into and out of a seat, including ingress and egress from any vehicle seat, irrespective of the nature of the vehicle or seat therein, as well as almost any seat such as chairs, couches, wheelchairs, and the like.

It is another object of the invention to provide a universal device which does not have the disadvantages inherent in prior art comparable devices.

It is still another object of the invention to provide a universal device of the type under discussion which is simple in construction and economical to manufacture.

It is yet another object of the invention to provide a universal device which is easy and convenient to use, portable, lightweight, secure and practical.

It is a further object of the invention to provide a universal device as in the previous objects which is portable and can be used by different passengers on different vehicles or by different passengers on the same vehicle.

It is still a further object of the present invention to provide a universal device of the type under consideration which can be readily and conveniently adjusted to accommodate a specific passenger, and automobile.

It is still a further object of the present invention to provide a universal device that does not interfere with the operation of usability of the vehicle and/or the vehicular compartment.

It is yet a further object of the present invention to provide a universal device as in the previous objects that can be used without damaging or deteriorating the performance of any of the components of the vehicle.

It is an additional object of the present invention to provide a universal device which can sustain substantial forces or loads in assisting a passenger in entering or exiting a vehicle.

It is still an additional object of the present invention to provide a universal device that can be used with all sizes and styles of vehicles, including vehicles that have low and higher centers of gravity and, therefore, have passenger seats that are located relatively close to the ground and those that are substantially above ground level.

It is yet an additional object of the invention to provide a universal device that can be used equally effectively under circumstances that require a passenger to apply a pulling force on the device when entering or exiting a vehicle or a pushing force, per individual preference.

It is a further additional object of the invention to provide a universal device that can be used with almost any seat, including vehicle seats, such as chairs, couches, wheelchairs and the like.

In order to achieve the above objects, as well as others which will become apparent hereinafter, a universal device in accordance with the present invention is used for facilitating movement into and out of a seat, including egress and/or ingress of a passenger from a vehicle. Typically, vehicles have a substantially vertical post or pillar to one side of the passenger seat part of which defines a lateral surface generally facing the passenger positioned at least partially through the door opening. The device includes an elongate member having a handle at one end suitable for being gripped by the passenger. Securement means is provided for cooperating with the other end of said elongate member for securing said elongate member to said lateral surface to enable said elongate member to extend away from the vehicle and position said handle exteriorly of the vehicle, and for providing support to the passenger independently of whether the passenger pulls on said handle in a direction generally up towards the vehicle or pushes on said handle in a direction generally down from the vehicle. In accordance with a presently preferred embodiment, said securement means comprises an engaging member that is at least partially received within a striker and configured to cooperate therewith to provide support to a user whether he or she is pushing and/or pulling on the handle. With minor design changes, the device can be used in conjunction with other seats, including chairs, sofas, wheelchairs and other seats.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which:

FIG. 3 is an enlarged side elevational view of the universal device shown in FIG. 2, shown partially broken away to show the interior construction and assembly of the device;

FIG. 4 is a cross sectional view of the universal device shown in FIG. 3, taken along line 4—4 and illustrating the relative angular positions of the telescoping tubes which allow the tubes to move or slide axially longitudinally relative to each other;

FIG. 5 is similar to FIG. 4, in which the telescoping tubes have been rotating relative to each other about their axes to cause the tubes to interlock and prevent further relative longitudinal movements;

FIG. 6 is similar to FIG. 5, but showing the universal device under the condition where a passenger pulls on the device to obtain necessary leverage to rotate him- or herself 90° from a forward-facing position and/or to exit the vehicle;

FIG. 7 is an enlarged cross sectional view of the universal device shown in FIG. 6, taken along lines 7—7 to illustrate the operation of the device;

FIG. 11 is a side elevational view of a modified embodiment—permanently mounted—of a device in accordance with the invention for use in vehicles; and FIG. 12 is similar to FIG. 11, but illustrating the device of FIG. 11 in an extended condition during use.

DETAILED DESCRIPTION OF THE PREFERRED EMBODIMENTS

Figure 1:
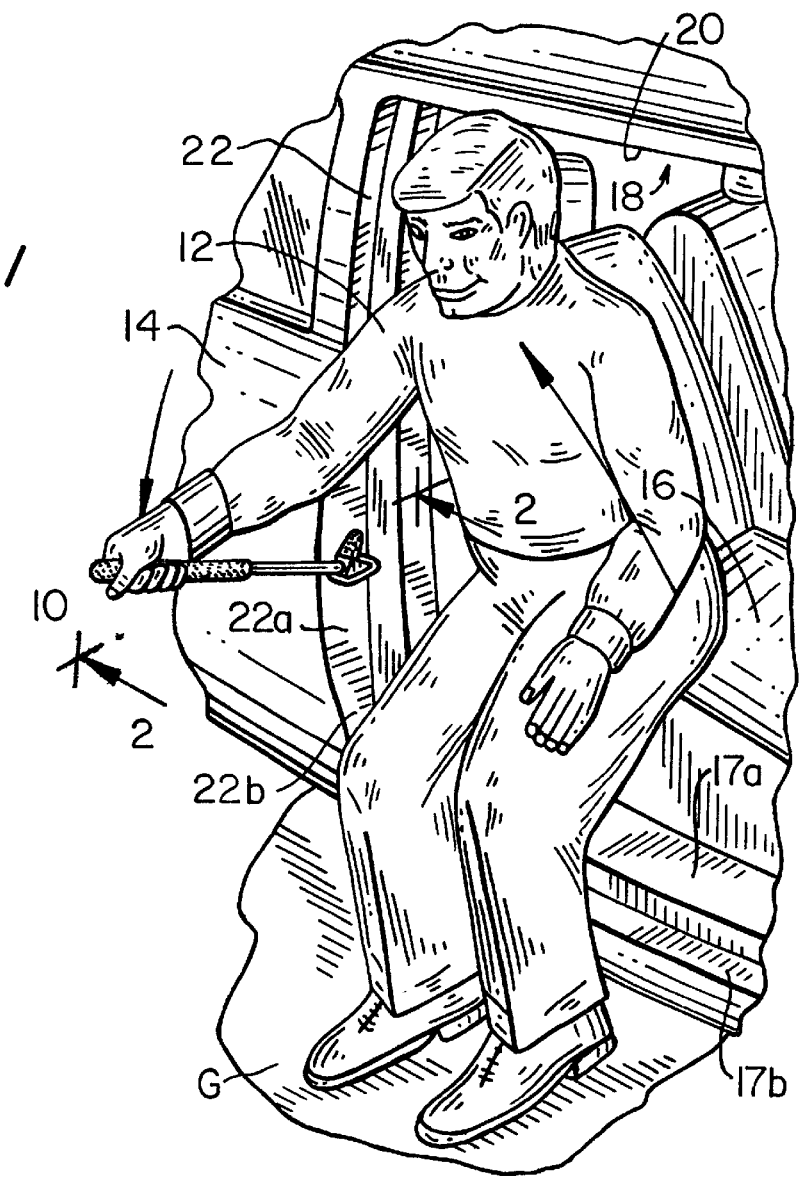
FIG. 1 is a perspective view of a passenger or occupant of a vehicle, shown in a position in which the passenger is about to elevate himself from a sitting position on a seat to a standing position by pushing on a universal device in accordance with the invention.
Figure 2:
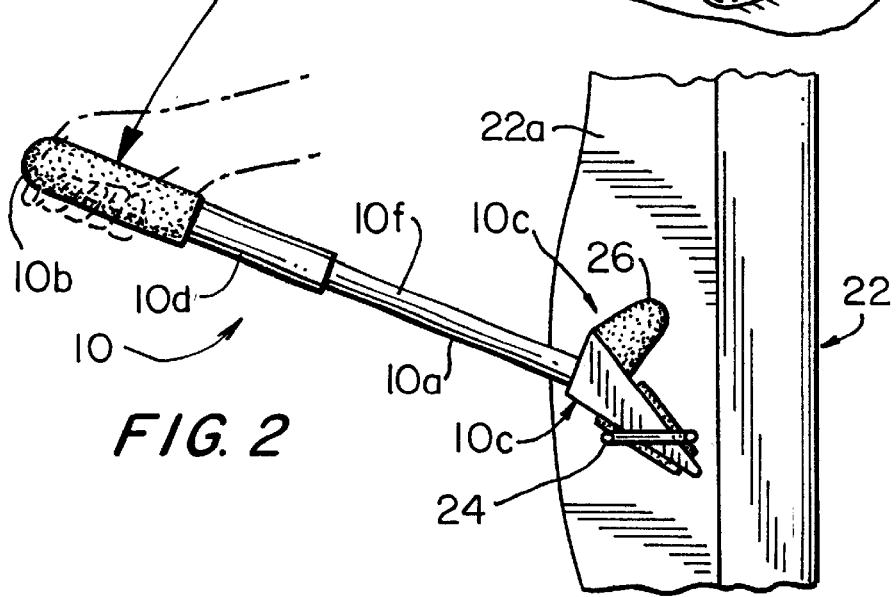
FIG. 2 is a side elevational view of the universal device shown in FIG. 1, as viewed in the direction 2—2, showing the condition of the universal device when a user applies a pushing force on the handle to obtain the necessary support while exiting a vehicle.

Referring now more specifically to the drawings, in which identical or similar parts are designated by the same reference numerals throughout, and first referring to FIGS. 1 and 2, a universal device in accordance with the invention is generally designated by the reference numeral 10.

The device 10 is intended to facilitate ingress and/or egress of a passenger 12 into or from a vehicle 14. While the shown embodiment is described in relation to an automobile environment it will be clear that in accordance with the broader aspects of the invention the device can have a range of applications, such as moving into and out of any seat such as a chair, sofa, wheelchair, and the like.

In FIG. 1 a passenger 12 is shown in a sitting position on a seat 16 within the interior or passenger compartment 18. The passenger 12 has shifted or rotated approximately 90° on the seat 16 to place the passenger's feet outside of the vehicle compartment, either with or without the help of pulling up against the device 10. The height of the floor or platform 17a of the vehicle and optional step 17b, in some vehicles, will determine whether the feet of the passenger will or will not reach the ground G in this position of the passenger in the seat. Thus, in larger vehicles having a center of gravity significantly above the ground level, the floor or platform 17a and, therefore, the seat 16, are significantly above the ground level. In that instance, the passenger's feet may not necessarily touch or rest on the ground when the passenger is still seated on the seat 16. Under those circumstances, the passenger must, in essence, jump or lower himself to the ground. With older individuals, as well as those who are infirm or ill, disabled or severely disabled, such a maneuver may be difficult or impossible. As will be described in more detail below, the universal device 10 of the invention permits the passenger to grab the handle thereof exteriorly of the vehicle and push on the handle to buffer the drop or leverage the weight of the individual from the legs or back (in which the passenger may have pain) to the arm to both provide a needed lift and to absorb some of the weight and stress involved with the repositioning of the passenger's body as it moves from a sitting to a standing position. In other instances, where the center of gravity of the vehicle is low, such as in sports cars, and the floor or platform 17a is relatively low on the ground, the repositioning of the body as shown in FIG. 1 causes the feet to be relatively high in relation to the seat when the feet are placed on the ground. In those instances, the passenger must effectively pull himself out of the seat. Again, for those who have difficulty with such a maneuver, the ability to grip and hold onto an device of the type disclosed herein facilitates such movements and leverages the necessary forces to accomplish said task. It will be appreciated, however, that whether a passenger will need to shift some of the weight when lowering themselves from a vehicle or pulling and/or pushing themselves out of the vehicle will be a function of the height of the seat as well as the size of the passenger. As a result, whether a passenger pulls or pushes will be a matter of personal preference and will depend on the given circumstances, as aforementioned. For this reasons, the universal device 10 in accordance with the present invention is constructed so that it can simultaneously serve both functions and, therefore, accommodate all passengers and all vehicles.

Conventionally, the vehicle 14 has an interior passenger compartment 18 that can be accessed by means of a door opening 20 that is normally closed by a door (not shown). The door opening 20 is bounded by a substantially vertical post or pillar 22 to one side of the passenger seat, shown in FIG. 1 as the rear of the passenger seat, that defines a lateral surface 22a (FIG. 2) generally facing the passenger 12 when the passenger is positioned as shown in FIG. 1 extending at least partially through the door opening 20.

Referring to FIG. 2, the device 10 includes an elongate member 10a having a handle 10b at one end suitable for being gripped by a passenger. At the opposing end 10c, a suitable securement element or engaging member cooperates with such end of the elongate member for securing the same to the lateral surface 22a to enable the elongate member 10a to extend away from the vehicle and position the handle 10b exteriorly of the vehicle, as shown in FIGS. 1, 2 and 6, and for providing support to the passenger, as to be described, independently of whether the passenger pulls on the handle in a direction generally towards the vehicle, as suggested in FIG. 6, or pushes down on the handle as suggested in FIGS. 1 and 2. However, depending on the profile of the vehicle, the device 10 can be customized to provide support primarily when pushing or pulling on the handle. The elongate member 10a may optionally be telescoping and include an outer tube 10d, preferably covered by a rubber or foam anti-slip grip 10e, and an inner tube 10f.

A presently preferred embodiment of the universal device of the invention cooperates with a generally U-shaped striker, best shown in FIG. 7, which is mounted on the lateral surface 22a for normally engaging a latch of a door lock when the door of the vehicle is closed. The striker extends in the direction of the door opening and is formed of two spaced substantially parallel leg portions 24a, 24b, extending from the lateral surface, and a bridging portion 24c extending between the leg portions 24a, 24b and spaced from the lateral surface a distance W (FIG. 7). The portions 24a–24c, together with the lateral surface 24a, define a generally rectangular opening 24d, 24d usually varies, albeit slightly, from manufacturer to manufacturer as well as from make and nameplate by model year. The rectangular opening 24d is arranged in a generally horizontal plane, although the plane of the striker may deviate slightly from the horizontal plane in different vehicles and under different load conditions. Neither circumstance described are important or critical to the function of the invention, and the device 10 can be fitted and used with almost any striker as long as a portion of the device can be inserted through it. The benefits of using the striker of an automobile to couple or to secure the device are that no modifications or customizations of the automobile are necessary and, therefore, a costly installation can be avoided. Additionally, the striker is, based on federal guidelines, inherently a very sturdy element or component that can sustain significant forces. Therefore, the striker can sustain forces substantially in excess of any forces that would normally be applied by an individual in using the device in entering or leaving the vehicle.

As best shown in FIGS. 2 and 3, the securement element in the preferred embodiment 10 is in the form of a tapered engaging member 10h fastened to the elongate member 10a, such as by means of a threaded portion 10i at the free end 10c. The tapered engaging member 10h is configured to engage any striker 24 when the door is open and used by the passenger to move into or out of the seat of the vehicle. While a specifically configured tapered engaging member 10h is shown, and will be described, it will be clear from the description that follows and from FIGS. 8–10 that the specific shape or configuration of the engaging member is not critical for the purpose of the present invention and different or other shapes or configurations can be used, with different degrees of advantage, as long as the engaging member 10h, at the end 10c, provides the function of securing the elongate member 10a to the lateral surface 22a to enable the elongate member to extend away from the vehicle and position the handle 10b exteriorly of the vehicle, as shown, to thereby provide support for the passenger. Preferably, the engaging member or element at the end 10c is configured to cooperate with the striker 24. However, as will be described in connection with FIGS. 11 and 12, some of the advantages of the present invention can also be achieved by securing the device directly to the lateral surface 22a without engaging the striker. When used with other seats, such as chairs, sofas, theater seats, wheelchairs, and the like, analogous techniques may be used to provide an attachable or attached shank and remote handle to provide the necessary leverage.

In the presently preferred embodiment 10, the engaging element 10h is dimensioned to extend through the rectangular opening 24d. More specifically, the engaging element 10h is tapered as shown and has a modified triangular cross section having a base 10p and an opposing apex or pointed edge 10q, the end 10c of the elongate member being secured to the base. With this arrangement, the engaging portion provides increasingly larger dimensions from the apex 10q in the direction of the end 10c to provide a maximum dimension at the base 10p which cannot pass through the rectangular opening 24d. With this arrangement, the engaging member 10h can be quickly and conveniently inserted into or through the opening 24d of the striker 24, the extent of penetration through the rectangular area 24d being a function of the relative dimensions of the rectangular area itself and the angle $\alpha$ of the taper of the engaging portion or member 10h.

As best shown in FIG. 7, the engaging portion or element 10h has a width or thickness "W" which is approximately equal to the width or depth "W" of the striker 24, although, clearly, it needs to be at least slightly smaller than W in order to be insertable through the rectangular area. The specific relationship between the dimensions W and w is not critical. However, clearly, the closer that w approaches W, the more the engaging element will fill the rectangular area. However, in some instances, it may be desired to reduce the dimension of w in order to render the device smaller and lighter in order to enhance portability. Although in the preferred embodiment the maximum dimension at the base 10p is greater than the distance or spacing D between the leg portions of the striker, this is not critical and a tapered engaging element which can fully pass or extend through the striker can also be useful. As will become clear from the description that follows, the operative portions of the tapered engaging element are frequently intermediate portions and the base need not always be utilized during use of the device. The base in this instance simply serves as a region to attach the engaging element to the elongate member 10a and to prevent the engaging element from fully passing through the striker. The advantage of the design, therefore, is that a user can position the engaging element through the striker, as suggested in FIGS. 2 and 6, and release the handle. The device will remain in position. Moreover, careful positioning of the engaging element through the striker during use without releasing the handle will still render the device useful.

The engaging element defines a forward surface 10j and a rear surface 10k for engaging the leg portions of the striker, as to be described. Grip-providing elements cover at least those portions of the engaging element, such as the front and rear surfaces 10j, 10k where additional friction may provide additional support. Specifically, the tapered engaging element 10h may be made of metal, such as alloy aluminum, and the covered front and rear surfaces provide a snugger, more secure feel to the user and may reduce the likelihood of scratching or marring because of metal-to-metal contact. Although two separate elements or pads, such as rubber pads, 10m and 10n, may be used, the two separate rubber pads also may either be shifted 90° a piece to attach to the embodiment's sides or be replaced with a continuous molded rubber sheath that surrounds the tapered engaging element. These alternatives will also assist with or ensure against the issues noted above regardless of user positioning or manipulation during product use.

Referring to FIG. 3, the elongate member 10a defines a longitudinal axis A. The tapered engaging member 10h defines a bisector line that extends through the apex or edge 10q, which defines a longitudinal direction A' of the engaging member 10h. Although the directions A, A' can be coextensive, in the presently preferred embodiment, the direction A' is slightly offset from the direction or axis A, by angle β. The angle β is not critical: in this embodiment, it is set at 25°. As will become clear, the greater the angle β, the further forward the handle 10b will be from the vehicle when the engaging element is positioned in the striker. Moreover, the criticality of this angle may be further obviated by the "grip variability" of the elongate member, providing a comfortable position for the handle whenever the user reaches to grip the handle. A useful range for the angle β may be, for example, within the range of 0° and 45°.

Similarly, the angle a defined between the forward and rear surfaces 10j, 10k is likewise not critical. However, because it is presently preferred to provide the engaging element 10h with an apex or edge 10q at the free or remote end, the angle α should be selected so that the engaging element can be readily inserted through the striker's rectangular opening and engage the leg portions of the striker soon after penetration. Clearly, the smaller the angle α, the longer the engaging element will need to be along the direction A' before the front forward and rearward surfaces 10j, 10k of the engaging element make contact with the striker's leg portions. A suitable range for α is not at all critical and is related to the final shape or morphology of the engaging element. As will be evident from FIG. 3, the forward surface 10j faces the direction of the offset, while the rearward surface 10k faces the direction opposite to the direction of the offset.

As best shown in FIG. 7, the leg portion 24a is closer to the exterior of the vehicle while the leg portion 24b is closer to the interior of the vehicle. The forward surface 10j of the tapered engaging element 10h and the rearward surface 10k thereof are arranged so that when the engaging element is inserted into or through the rectangular opening 24d from the top, as shown in FIGS. 2 and 6, the forward surface 10j generally applies a downward force on the front leg 24a, and the rearward surface 10k generally applies an upward force on the rear leg portion 24b when a passenger pushes down on the handle, as shown in FIG. 2. On the other hand, the rearward surface 10k generally applies a downward force on the rear leg portion 24b and 10j generally applies an upward force on the front leg 24a when the passenger pulls up on the handle, as shown in FIG. 6. However, with a heel 26 in place, depending on its size and shape, the heel may first engage the surface 22b as shown in FIGS. 6 and 7 before the rearward surface 10k could make contact with the rear leg portion 24b. Preferably, the device 10 also includes a heel portion 26 that extends from the rearward surface 10k and is dimensioned to abut against the outwardly facing surface 22b before engagement between the rearward surface 10k and the rear leg portion 24b where the passenger pulls on the handle, as indicated in FIG. 6. The front leg portion 24a may now help serve as a limit stop for controlling the extent of movement of the handle following contact or abutment of the heel 26 against the surface 22b.

It will be evident, therefore, that the extent of movement of the handle 10b when pulled by a passenger is a function of both the size of the heel portion 26 and the extent of penetration of the tapered engaging portion 10h into or through the rectangular opening 24d. In the embodiment shown, the length of the heel 26 along the axis or direction A" is less than the length of the engaging member 10h along its longitudinal direction A', although the relative dimensions or lengths of these components are not critical, and any suitable dimensions may be used to conform to a vehicular grouping (or a particular vehicle) and to achieve the desired effect.

As best shown in FIG. 3, the longitudinal direction A" of the heel 26 is shown to be generally normal (γ=90°) to the longitudinal direction A' of the tapered engaging member 10h. However, the precise angle γ used for this purpose is not critical. The heel 26 is preferably mounted on that portion of the tapered engaging member 10h in the region of the base 10p and remote from the apex 10q by attaching the heel 26 on the rearward surface 10k as shown, the heel 26 minimally interfering with the Insertion of the tapered engaging member 10h through the striker and also provides the user maximum leeway or versatility in the usable positions of the device that may provide varying degrees of comfort to different users.

As best shown in FIG. 3, the longitudinal direction A" of the heel 26 is shown to be generally normal to the longitudinal direction A' of the tapered engaging member 10h. However, the precise angle γ used for this purpose is not critical. The heel 26 is preferably mounted on that portion of the tapered engaging member 10h in the region of the base 10p and remote from the apex 10q by attaching the heel 26 on the rearward surface 10k as shown, the heel 26 minimally interfering with the insertion of the tapered engaging member 10h through the striker and also provides the user maximum leeway or versatility in the usable positions of the device that may provide varying degrees of comfort to different users.

To give the user more versatility in the use of the device, although in no way critical to the invention, the elongate member 10a in this embodiment is made adjustable in length so that the "grab" position of the handle 10b can be stationed at a comfortable height and distance from the vehicle. In some instances, a user may be most comfortable by fully extending the hand to grip the handle, as shown in FIG. 1, and in other instances a user may feel more comfortable in seizing the handle 10b when the arm is slightly bent. This is made possible, in the embodiment 10 shown, by making the elongate member in the form of telescoping tubes including outer tube 10d and inner tube 10f. The end of the outer tube 10d is preferably provided, as noted, with a rubber or foam grip 10e for maximum comfort and to prevent slippage. The telescoping tubes 10d, 10f are preferably provided with means to position such tubes relative to each other at desired positions and subsequently lock in those positions. The means for achieving this are well known in the art, and such telescoping tubes are currently used in many applications. Without describing the details of how this is done, FIGS. 4 and 5 suggest that in one relative angular or rotation position of the tubes, clearances or spaces 10g allow the telescoping tubes to slide longitudinally along the axis A relative to each other. Once a desired length is reached, the tubes are rotated about the axis A relative to each other to lock the tubes by effectively eliminating the clearances 10g and, instead, providing an interference fit, as suggested in FIG. 5. The specific manner for adjusting the telescoping position of the tube is not critical and any suitable mechanism for this purpose may be used.

In use, a passenger wishing to exit from a vehicle would begin by turning themselves approximately 90° from a normal position facing forward in the vehicle to a position shown in FIG. 1. Importantly, as indicated by FIG. 6, the user can actually use the invention to turn or rotate themself by pulling up on the handle. As indicated above, depending on the relative height of the seat 16 above the ground G, a user would need to determine whether maximum leverage or shifting of weight could be achieved best by pushing on the handle 10b, as shown in FIG. 1, or by pulling on such handle, as shown in FIG. 6. The passenger would then insert the tapered engaging portion 10h through the top rectangular opening of the striker 24. This could be done prior or subsequent to the 90° shift or turn so that the user would pull up on the handle to accomplish such shifting or turning. Once the device 10 is seated securely within the striker, the user can apply substantial pushing forces on the device to leverage or transfer a considerable amount of weight thereto. Similarly, when a user needs to pull themself out of the seat and needs to generate leverage by pulling up on the device, the tapered engaging portion 10h is again inserted through the top opening of the striker and the handle pulled against until the heel 26 engages or abuts against the surface 22b. Once this condition has been achieved, significant forces can again be applied to the handle to achieve the desired positioning. As shown in the accompanying figures, pushing and pulling against the elongated member once the engaging element is seated will result in pivoting of the handle along one plane relative to the striker in this described embodiment and optimization of the handle for use. This relative motion is not essential to the invention: the engaging member can be designed to prevent such motion and lock in position.

Figure 8:
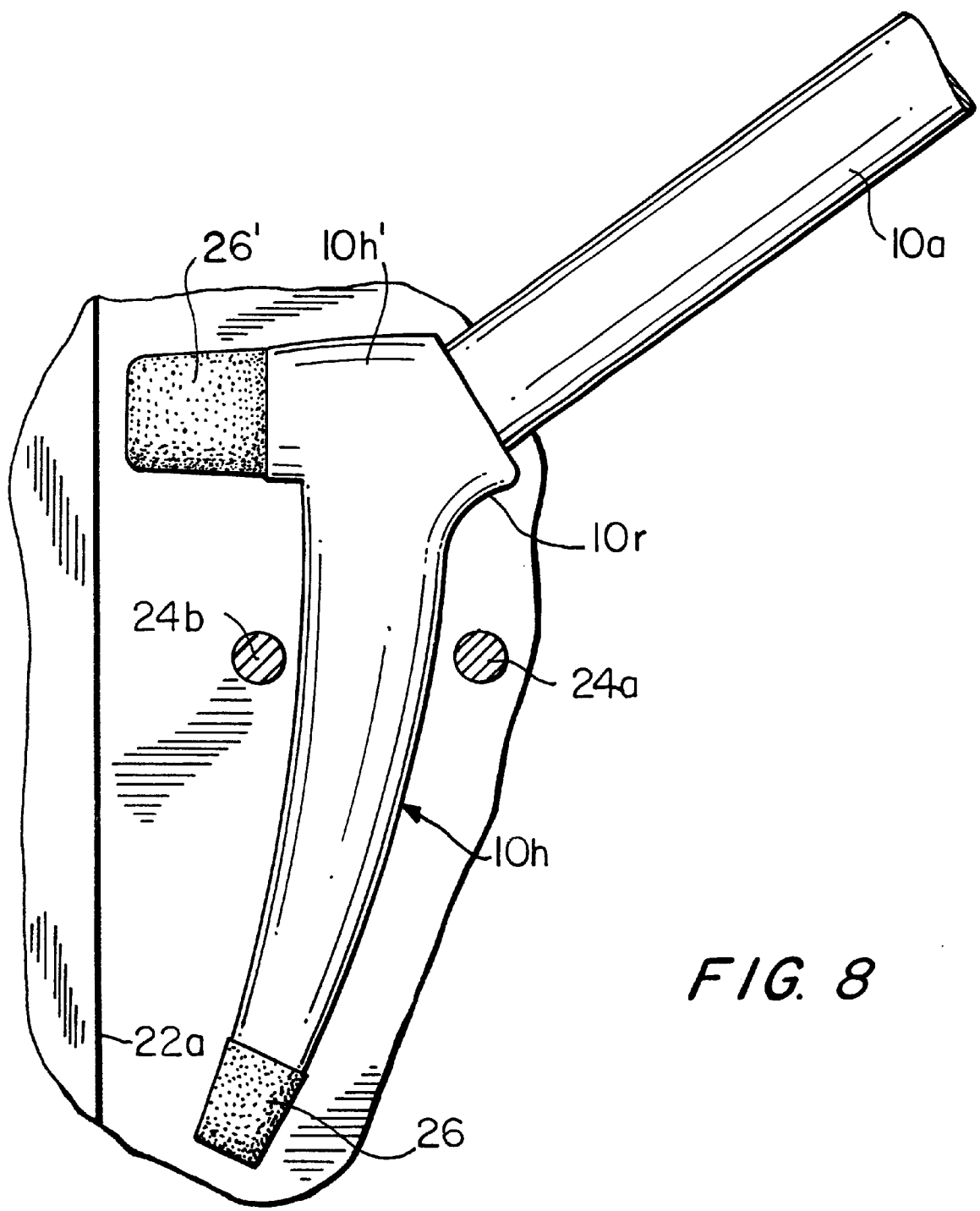
FIG. 8 is a side elevational view of an alternate form of the securement member engaged with a striker on a vehicle door post, showing the tapered engaging member somewhat curved and the heel attached to an integrally formed extension of the engaging member.

Referring to FIG. 8, an alternate embodiment of the engaging member is illustrated in which the tapered engaging member 10h of FIG. 3 at the forward and rear surfaces 10h, 10k are arcuate instead of being straight. A boot 26 is mounted at the free end of the engaging member 10h, and the heel 26' is mounted on an extension 10h', as shown. The upper portion of the forward surface 10j is provided with a curved or arcuate region 10r in proximity to the elongate member 10a to significantly widen the engaging member 10h to engage the forward leg portion 24a to thereby limit the extent of penetration through the striker. It will be clear that with this arrangement, pulling on the elongate member 10a towards the surface 22a will pivot the device about the striker and result in the heel 26' abutting or contacting the surface 22a. When the elongate member 10a is pushed in a direction away from the surface 22a, it will be equally evident that the device will pivot about the striker until the boot 26 engages the surface 22a. The boot 26 is, for reasons discussed above, also made of a soft material, such as rubber or other elastomeric material.

Figure 9:
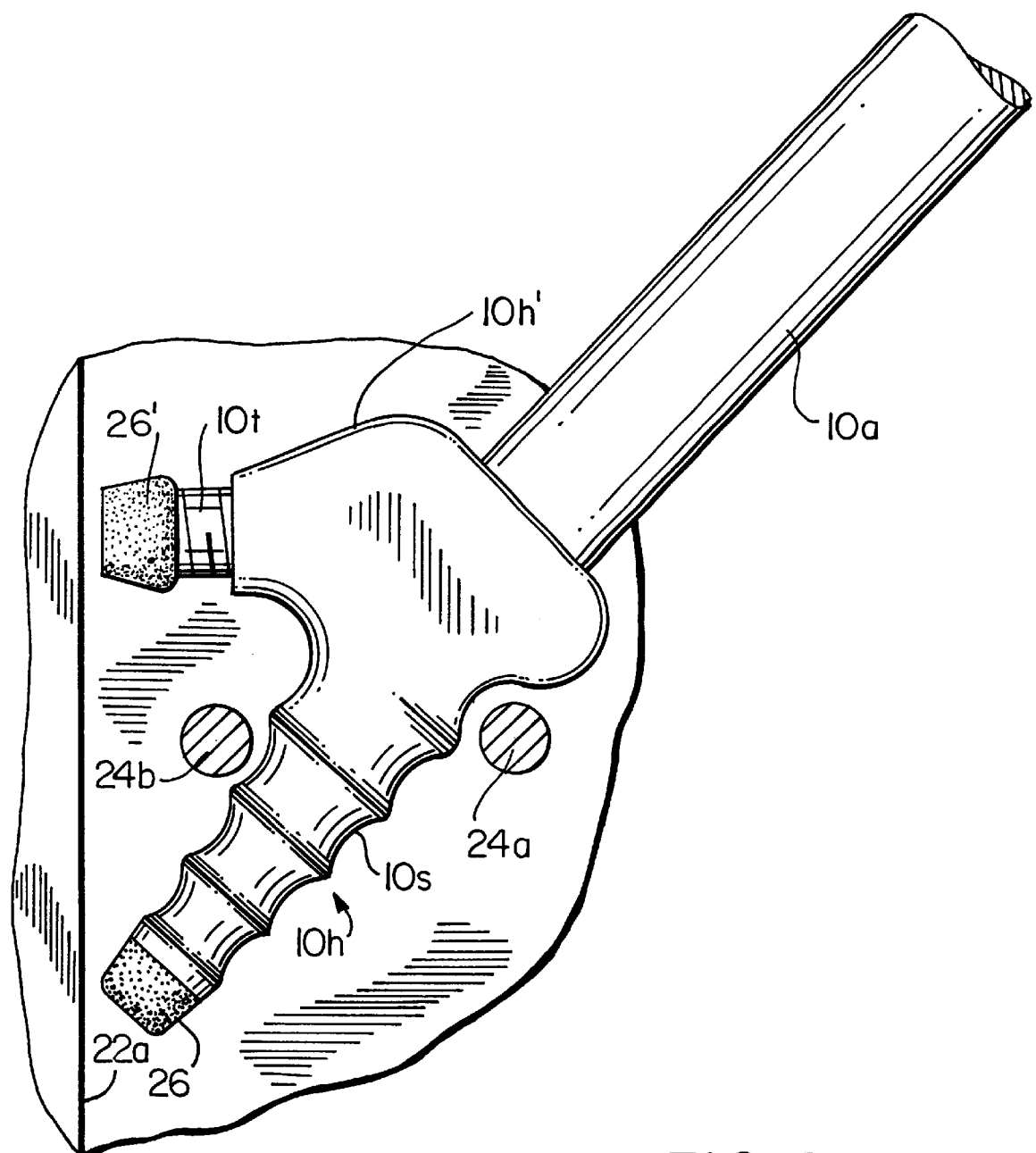
FIG. 9 is similar to FIG. 8, but illustrating a series of annular indentations on the engaging member dimensioned to receive the leg portions of the striker to enhance stability and prevent slippage, and also illustrating the heel to be adjustably mounted on the engaging member.

In FIG. 9, an alternative embodiment is shown in which the forward and rearward surfaces 10h, 10k are provided with a series of annular indentations or grooves 10s, as shown, defining radii of curvature that substantially correspond to the diameters of the striker leg portions to be received therein. It will be appreciated that once the leg portions are received within the annular indentations or grooves, this will prevent slippage and enhance stability during use. The embodiment shown in FIG. 9 is also shown to include a heel 26' which is adjustably mounted on the extension 10h' by a screw or thread adjustment 10t so that the position of the elongate member can be very closely controlled when pulled towards the surface 22a by adjusting the extent by which the boot 26' is moved towards or away from the extension 10h'.

Figure 9A:
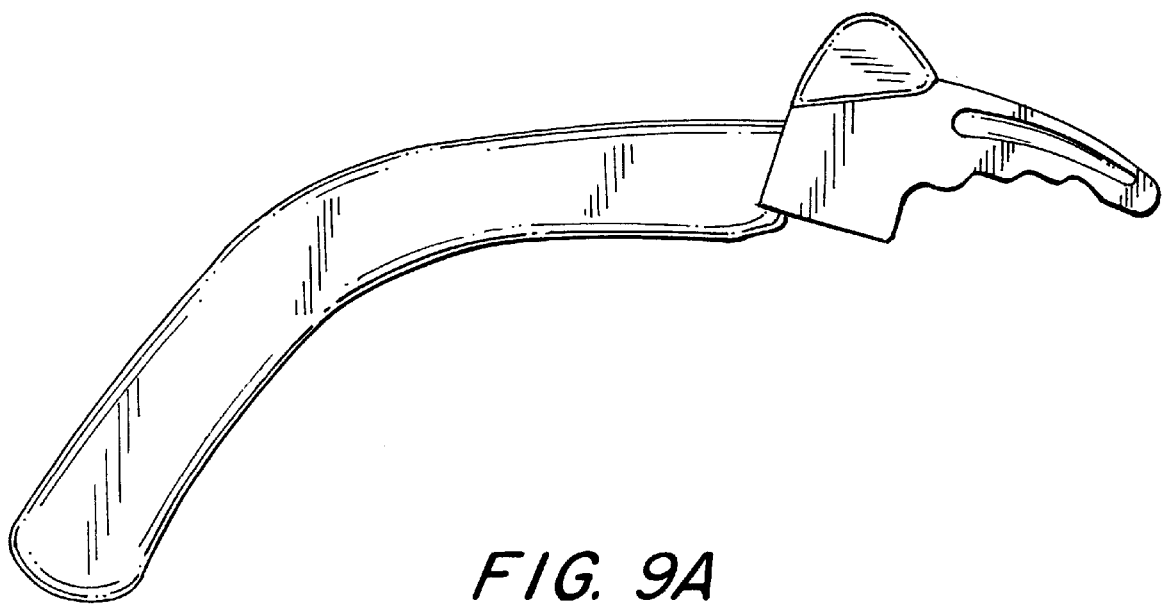
FIGS. 9A and 9B illustrate variations of the embodiment shown in FIG. 9, each having a convex outer surface and an indented, scalloped inner surface with optional grip-providing elements fixed to the lateral sides.
Figure 9B:
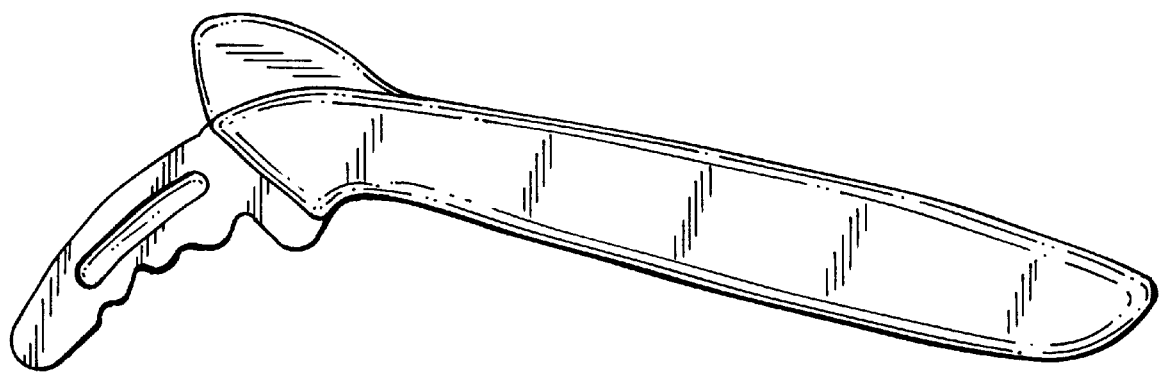

In FIGS. 9A and 9B, two modified embodiments are shown generally of the type shown in FIG. 9, each having similar engaging members or elements that have convex outer surfaces. The opposing or inner surfaces are provided with the scalloped indentations. Optional grip elements are provided on the lateral sides of the engaging elements, as shown. In FIG. 9A the handle is shown curved while the handle in FIG. 9B is more straight. With these embodiments, the striker is only secured along the one scalloped edge this being sufficient to provide desired engagement.

Figure 10:
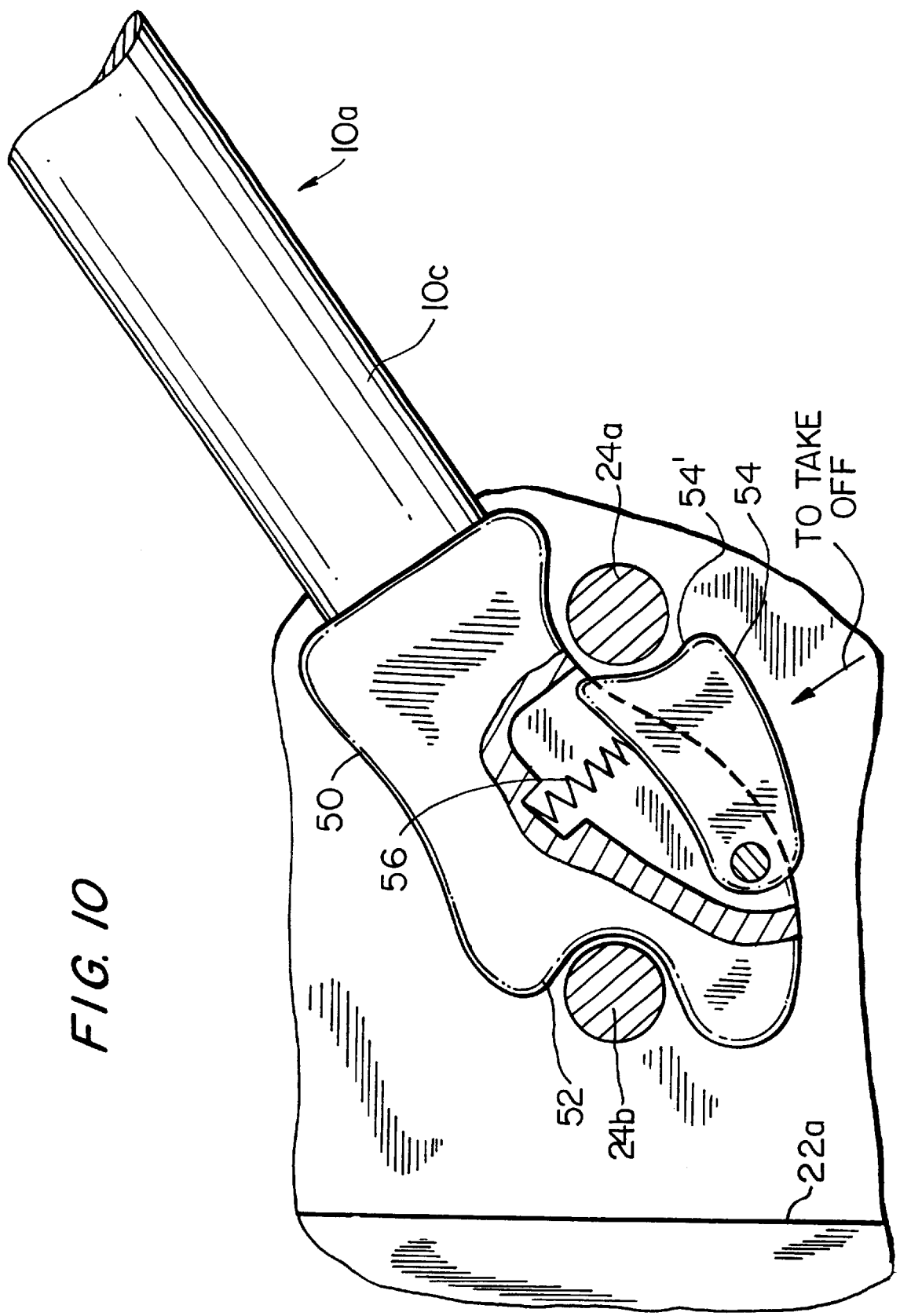
FIG. 10 is similar to FIGS. 8 and 9, in which the engaging member includes one recess for receiving one leg portion of the striker and a resiliently biased pawl forming an opposing recess and configured to abut against the opposite or opposing striker leg portion which selectively locks the engaging portion to the striker until the pawl is manually retracted to release the striker.

In FIG. 10, a variant of the present invention is shown in which the securement mechanism for securing the device to the striker is in the form of a body 50 secured to the free end 10c of the elongate member. The body 50 includes a recess 52 having a shape or configuration for receiving the rear leg portion 24b, as shown. By pivoting the elongate member about the leg portion 24b in a clockwise direction, as viewed in FIG. 10, a pawl 54 will initially engage the rear leg portion 24a and be moved inwardly against the action of the spring 56 to the phantom position suggested at 58. Once the front leg portion 24a reaches the position shown, it will clear the pawl 54, and the pawl 54 will again be extended by the action of the spring 56. Once so extended, it will be evident that the arcuate region 54' will block the device from being pivoted in a counterclockwise direction about the leg portion 24b unless the pawl 54 is manually pressed inwardly, as suggested by the arrow in FIG. 10, to clear the front leg portion 24a. Until the pawl 54 is moved to the releasing position, however, the device can be pulled in a counter-clockwise direction, as viewed in FIG. 10, while providing stability to the user as a result of the fixing or securement feature shown and described.

In FIGS. 11 and 12, an alternate variation is shown which does not directly cooperate with the striker of the vehicle. However, the embodiment 60 in these figures is secured or mounted on the same lateral surface 22a, but is intended to be maintained on that surface at all times. Most vehicles contain a clearance between the lateral surface 22a and the door in the closed position. The construction of the device 60 from a flat bar stock allows the device 60 to be stored within that region without interfering with the operation of the door. Such clearance space, in most vehicles, will measure at least ⅜ of an inch. Although a single flat member may be used, in the presently preferred embodiment 60, two articulated flat members 62, 64 are provided (the former having a "grip" material covering its open end), each of which is pivotally connected to the lateral surface 22a and suitable locking devices are used for locking the two flat members in the extended position shown in FIG. 12. The specific locking mechanism for locking the two bars in the extended position is not critical, and any suitable locking devices may be used. Since the device 60 does not directly cooperate with the striker 24, other suitable locking devices must be used for maintaining the bars in the desired position exteriorly of the vehicle, as suggested in FIG. 9. Spring biased pins, for example, may be used which are normally maintained within the door frame or post by the device 60 when in the stored or inoperative condition shown in FIG. 11. However, when the bars are pivoted outwardly about pivot pin 70, the resiliently biased pin 66 can extend beyond the surface 22a and becomes a limit stop, as suggested by the phantom outline of the bar 64. To restore the device after use (either push or pull) to the storage condition shown in FIG. 60, the resiliently biased pin 66 may be manually depressed or activated by a remote switch and the bar 64 pivoted about the pin 70 to a substantially vertical position thereby retaining the pin 66 within the post. The pin 68 may be fixed and just long enough to engage the bar 64 but short enough not to interfere with the closing of the door.

As suggested above, the device in accordance with the present invention, in all of its embodiments, provides a simple, reliable device that can make access into and out of any seat or seated position easy and stress free. By making the tubes 10d and 10f out of a hollow yet exceptionally sturdy metal such as alloy aluminum, and also making the engaging members 10h from lightweight material, the entire device can be made extremely lightweight with the primary described embodiment weighting less than 7 ozs. By making the elongate member 10a either compact/short or collapsible/telescoping, the device will be small enough to be portable (e.g., placed in a jacket pocket or woman's handbag) or easily stored (e.g., map pocket or car glove box) so that the device can always be available when needed. If desired, a suitable generally U-shaped spring clip can be car-mounted, for example, on the inside surface of the post 22 or elsewhere to clip the device onto the elongate member 10a for ready availability and use. Additionally if desired, a carrying case can be provided, a flashlight and/or key chain retrofitted into the handle 10a etc. to provide added-value benefits.

Primarily with regard to the present invention's use in automobiles, unlike prior art aids, the present invention: does not protrude into the passenger interior compartment, is unobtrusive and innocuous, is easy-to-use, and is, when not in use, invisible or transparent to all. The device is universal in that it can be used by all passengers and the driver in connection with any of the doors of all vehicles, irrespective of whether such use involves a preference for pushing down on the device to leverage or shift the weight, or pulling upon such device, or both. More important, the invention is universal in its utility and appeal, and provides multiple benefits to all end-users. All of the embodiments, whether cooperating directly with the striker on a post of an automobile or not, will sustain significant forces, greater than any anticipated forces that could normally be applied by an individual, whether pulling up or pushing down on the device.

While this invention has been described in detail with particular reference to preferred embodiments thereof, it will be understood that variations and modifications will be effected within the spirit and scope of the invention as described herein and as defined in the appended claims. For example, while the device has been described for use with a U-shaped striker, it will be evident to those skilled in the art that the device can be modified to engage/grip a door latch post of the type frequently found on older vehicles.

What I claim:

1. A device for facilitating movement into and out of a seat, comprising an elongate member having a handle at one end suitable for being gripped by an individual, and securement means cooperating with the other end of said elongate member for securing said elongate member to a fixed surface proximate to a seat to enable said elongate member to extend away from the seat and position said handle at a point remote from the seat during use for providing support to the user independently of whether the user pulls on said handle in a direction generally upwards or pushes on said handle in a direction generally downwards, said securement means mounting said elongate member for limited movements within a plane substantially parallel to the fixed surface to at least one operative position most convenient to the user when pulling or pushing on said handle.

2. Device for facilitating egress and/or ingress of any passenger and/or a driver from a vehicle having a door opening through which said individual(s) can move into or out of a seat in the vehicle and having a post or pillar to one side of the seat that defines a lateral surface generally proximate to the individual; the device comprising an elongate member having a handle at one end suitable for being gripped by the individual and securement means cooperating with the other end of said elongate member for removably securing said elongate member to lateral surface to enable said elongate member to extend away from the lateral surface during use and position a portion of said handle exteriorly of the vehicle and for providing a support for the passenger to grip while entering or leaving said vehicle independently of whether the passenger pulls on said handle in a direction generally upwards or pushes on said handle in a direction generally downwards, said securement means mounting said elongate member for limited movements within a plane substantially parallel to the fixed surface to at least one operative position most convenient to the user when pulling or pushing on said handle.

3. Universal device for facilitating egress and/or ingress of any passenger and/or a driver from a vehicle having a door opening through which said individual(s) can move into or out of a seat in the vehicle and having a post or pillar to one side of the seat that defines a lateral surface generally proximate to the individual and provided with a generally U-shaped striker mounted on said lateral surface for normally engaging a latch of a door lock when the door of the vehicle is closed, the striker extending in the direction of the door opening; the device comprises an elongate member having a handle at one end suitable for being gripped by the individual and securement means cooperating with the other end of said elongate member for removably securing said elongate member to said lateral surface to enable said elongate member to extend away from the lateral surface and position a portion of said handle exteriorly of the vehicle and for providing a support for the passenger to grip while entering or leaving said vehicle independently of whether the passenger pulls on said handle in a direction generally upwards or pushes on said handle in a direction generally downwards, said securement means comprising an engaging element at said other end of said elongate member for engaging the striker when the door is open and used by the passenger to move into or out of the seat of the vehicle.

4. Device as defined in claim 3, wherein the striker defines a generally rectangular opening, said engaging element comprising an engaging portion dimensioned to extend through said rectangular opening.

5. Device as defined in claim 4, wherein said engaging portion is tapered to generally provide an increasingly larger dimensions in the direction of said handle to provide a maximum dimension which cannot pass through said rectangular opening, whereby initial insertion of said engaging portion through said rectangular area is facilitated by a pointed edge of said tapered engaging portion and the extent of penetration through said rectangular area is a function of the relative dimensions of said rectangular area and the taper portion on said engaging portion.

6. Device as defined in claim 5, wherein either the U-shaped or the rectangular shaped striker is formed of two spaced substantially parallel leg portions mounted on and extending from the lateral surface and a bridging portion extending between said leg portions and spaced from the lateral surface a distance W, and said engaging portion having a width less than W.

7. Device as defined in claim 5, wherein either the U-shaped or the rectangular shaped striker is formed of two spaced substantially parallel leg portions mounted on and extending from the lateral surface and a bridging portion extending between said leg portlons and spaced from the lateral surface a distance W, and said engaging portion having a width approximately equal to W.

8. Device as defined in claim 6, wherein said leg portions are spaced a distance D and said taper in said engaging portion has a maximum dimension greater than D.

9. Device as defined in claim 6, further comprising general self covering means for covering at least a portion of said engaging portion improving the "grab" of the engaging portion and reducing the likelihood of scratching either the striker or the device during use.

10. Device as defined in claim 6, wherein said engaging portion defines a tapered portion of generally triangular cross section having a base and an opposing apex, said elongate member being secured to said base.

11. Device as defined in claim 6, wherein said engaging portion defines a convex outer surface (10k) and a scalloped inner surface (10j).

12. Device as defined in claim 10, wherein said elongate member defines a longitudinal axis and a bisector line extending through said apex is offset or inclined from said longitudinal axis to define a forward surface facing the direction of the offset and a rearward surface facing the direction opposite to the direction of the offset.

13. Device as defined in claim 12, wherein one of said leg portions closer to the exterior of the vehicle is a front leg portion and the other of said leg portions closer to the interior of the vehicle is a rear leg portion, said forward and rearward surfaces being arranged so that when said engaging portion is inserted into said rectangular opening from the top said forward surface generally applies a downward force on said front leg portion and said rearward surface generally applies an upward force on said rear leg portion when a passenger pushes on said handle and said forward surface generally applies an upward force on said front leg portion and said rearward surface generally applies a downward force on said rear leg portion when the passenger pulls on said handle.

14. Device as defined in claim 13, wherein the vertical post or pillar has a generally outwardly facing surface between the striker and the interior of the vehicle in proximity to the striker, and further comprising a heel portion extending from said rearward surface and dimensioned to abut against the outwardly facing surface with engagement between said rearward surfaces engages said rear leg portion when the passenger pulls on said handle, said front leg portion serving as a limit stop for controlling the extent of movement of said handle.

15. Device as defined in claim 14, wherein the extent of movement of said handle when pulled by the passenger is a function of the size of said heel portion and the extent of penetration of said tapered portion into said rectangular opening, wherein said heel portion having a length less than length of said engaging portion.

16. Device as defined in claim 14, wherein said heel portion defines a direction generally normal to the direction of said bisector.

17. Device as defined in claim 14, wherein said heel portion extends from said engaging portion in the region of said base and remote from said apex.

18. Device as defined in claim 14, wherein at least a portion of said heel arranged to engage or abut against said outwardly facing surface is made from non-scratching material.

19. Device as defined in claim 18, wherein said material is an elastomeric material.

20. Device for facilitating ingress and/or egress of any passenger and/or driver from a vehicle having a door opening through which the individual can move into or out of a seat in the vehicle and having a post or pillar to one side of the passenger seat that defines a lateral surface generally proximate to the individual and a generally U-shaped striker mounted on the lateral surface defining an opening for normally receiving a latch of a door lock when the vehicle door is closed, the device comprising an elongate member having a handle at one end suitable for being gripped by the individual; and engagement means cooperating with the other end of said elongate member for cooperating with the striker when the door is open and for securing said elongate member to the striker to enable said elongate member to extend away from the vehicle and position said handle exteriorly of the vehicle and for providing support to the individual when entering or exiting the vehicle.

21. Universal device for facilitating egress and/or ingress of any passenger and/or a driver from a vehicle having a door opening through which said individual(s) can move into or out of a seat in the vehicle and having a post or pillar to one side of the seat that defines a lateral surface generally proximate to the individual; the device comprises an elongate member having a handle at one end suitable for being gripped by the individual and securement means cooperating with the other end of said elongate member for removably securing said elongate member to said lateral surface to enable said elongate member to extend away from the lateral surface and position a portion of said handle exteriorly of the vehicle and for providing a support for the passenger to grip while entering or leaving said vehicle independently of whether the passenger pulls on said handle in a direction generally upwards or pushes on said handle in a direction generally downwards, wherein said elongate member comprises telescoping tubes, and further comprising means for selectively fixing said telescoping tubes in desired relative positions to accommodate different passengers.

22. Universal device for facilitating egress and/or ingress of any passenger and/or a driver from a vehicle having a door opening through which said individual(s) can move into or out of a seat in the vehicle and having a post or pillar to one side of the seat that defines a lateral surface generally proximate to the individual; the device comprises an elongate member having a handle at one end suitable for being gripped by the individual and securement means cooperating with the other end of said elongate member for removably securing said elongate member to said lateral surface to enable said elongate member to extend away from the lateral surface and position a portion of said handle exteriorly of the vehicle and for providing a support for the passenger to grip while entering or leaving said vehicle independently of whether the passenger pulls on said handle in a direction generally upwards or pushes on said handle in a direction generally downwards, wherein said lateral surface forming with an associated door a clearance space when the door is closed, and wherein said elongate member comprises at least one generally flat member having a thickness selected to be received within said clearance space without interfering with the normal operation of the door; and said securement means comprises locking means for enabling said at least one flat member to be pivoted to an operative position and maintained in said position.

23. Device as defined in claim 22, wherein two articulated flat members are provided, one of which is pivotally connected to said lateral surface and said locking means includes first lock maintaining said two flat members aligned in extended condition during use and second lock for maintaining said flat members in a desired operative position during use.

* * * * *